(12) United States Patent
Kimura

(10) Patent No.: US 10,753,324 B2
(45) Date of Patent: Aug. 25, 2020

(54) INLET DUCT FOR INTERNAL COMBUSTION ENGINE

(71) Applicant: TOYOTA BOSHOKU KABUSHIKI KAISHA, Aichi (JP)

(72) Inventor: Ryusuke Kimura, Ichinomiya (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/177,853

(22) Filed: Nov. 1, 2018

(65) Prior Publication Data

US 2019/0136806 A1 May 9, 2019

(30) Foreign Application Priority Data

Nov. 9, 2017 (JP) .................................. 2017-216711

(51) Int. Cl.
*F02M 35/12* (2006.01)
*B29C 70/42* (2006.01)
*F02M 35/10* (2006.01)
*B29L 31/00* (2006.01)

(52) U.S. Cl.
CPC ......... *F02M 35/1272* (2013.01); *B29C 70/42* (2013.01); *F02M 35/10098* (2013.01); *F02M 35/1283* (2013.01); *B29K 2995/0067* (2013.01); *B29L 2031/7492* (2013.01)

(58) Field of Classification Search
CPC ........... F02M 35/1272; F02M 35/1283; F02M 35/10098; B29C 70/42; B29L 2031/7492; B29K 2995/0067
See application file for complete search history.

(56) References Cited

U.S. PATENT DOCUMENTS

| | | | | |
|---|---|---|---|---|
| 4,921,658 A | * | 5/1990 | Pennington | ............. B29C 70/12 264/122 |
| 6,033,501 A | * | 3/2000 | Yamaguchi | ........... B29C 43/006 156/62.2 |
| 2007/0278034 A1 | * | 12/2007 | Yamaura | ................ F02M 35/02 181/229 |
| 2012/0292127 A1 | * | 11/2012 | Teshima | ........... F02M 35/10144 181/224 |
| 2017/0314807 A1 | * | 11/2017 | Prihoda | ............... F24F 13/0218 |

FOREIGN PATENT DOCUMENTS

JP    5091741    10/2009
WO    WO-2017126127 A1  *  7/2017  ............. F01N 13/08

* cited by examiner

*Primary Examiner* — Jacob M Amick
*Assistant Examiner* — Charles Brauch
(74) *Attorney, Agent, or Firm* — Greenblum & Bernstein, P.L.C.

(57) ABSTRACT

An inlet duct for an internal combustion engine includes a tubular body portion having an air-permeable side wall and a tubular suction portion that is arranged on an upstream side of the body portion in an intake airflow direction and has an inner peripheral surface that expands radially outward toward the upstream side. The body portion and the suction portion are formed integrally by a compression-molded fiber molding.

10 Claims, 3 Drawing Sheets

INLET DUCT FOR INTERNAL COMBUSTION ENGINE

BACKGROUND

The present invention relates to an inlet duct for an internal combustion engine that has an air-permeable side wall.

Conventionally known is an intake duct for an internal combustion engine that has a tubular wall formed by a fiber molding made of, for example, non-woven fabric (see, for example, Japanese Patent No. 5091741).

In the intake duct described in the aforementioned document, a downstream duct section made of a hard plastic is coupled to the downstream end of a porous duct made of an air-permeable material such as non-woven fabric. An upstream duct section made of a hard plastic is coupled to the upstream end of the porous duct. The upstream duct section has a funnel-like intake opening.

The intake duct absorbs sound waves of the intake sound when the sound waves pass through the tubular wall of the porous duct. That is, the pressure produced by the sound waves of intake sound vibrates the fibers configuring the tubular wall. The energy generated through such vibration is converted into frictional heat in the fibers and thus consumed. This restricts generation of standing waves of the intake sound in the intake duct, thus decreasing the intake noise.

In the intake duct described in the aforementioned document, the porous duct and the upstream duct section are formed as separate members. This brings about a step in the inner peripheral surface of the section that couples the porous duct and the upstream duct section to each other. The step increases the airflow resistance to the intake air flowing in the intake duct.

SUMMARY

Accordingly, it is an objective of the present invention to provide an inlet duct for an internal combustion engine that is capable of decreasing intake noise by employing an air-permeable side wall and of limiting increase in airflow resistance.

To achieve the foregoing objectives, an inlet duct for an internal combustion engine includes a tubular body portion having an air-permeable side wall and a tubular suction portion that is arranged on an upstream side of the body portion in an intake airflow direction and has an inner peripheral surface that expands radially outward toward the upstream side. The body portion and the suction portion are formed integrally by a compression-molded fiber molding.

DETAILED DESCRIPTION

With reference to FIGS. 1 to 4, an inlet duct 10 of an embodiment will now be described. Hereinafter, the upstream side and the downstream side in the intake airflow direction in the inlet duct 10 will be referred to simply as the upstream side and the downstream side.

Figure 1:
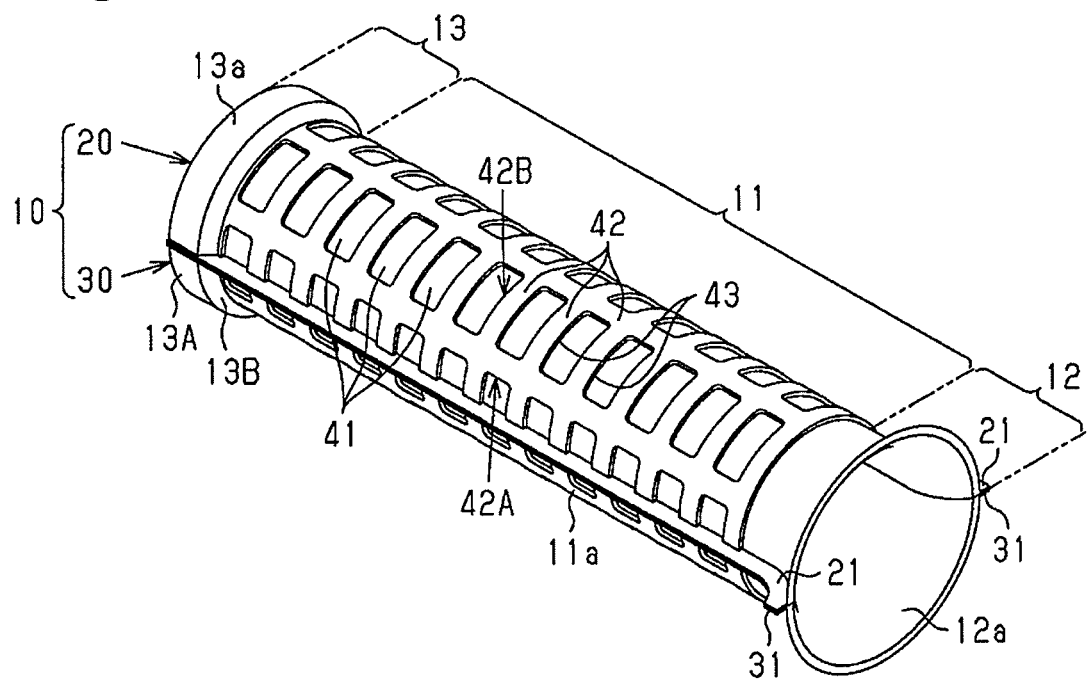
FIG. 1 is a perspective view showing an inlet duct for an internal combustion engine according to an embodiment.
Figure 3:
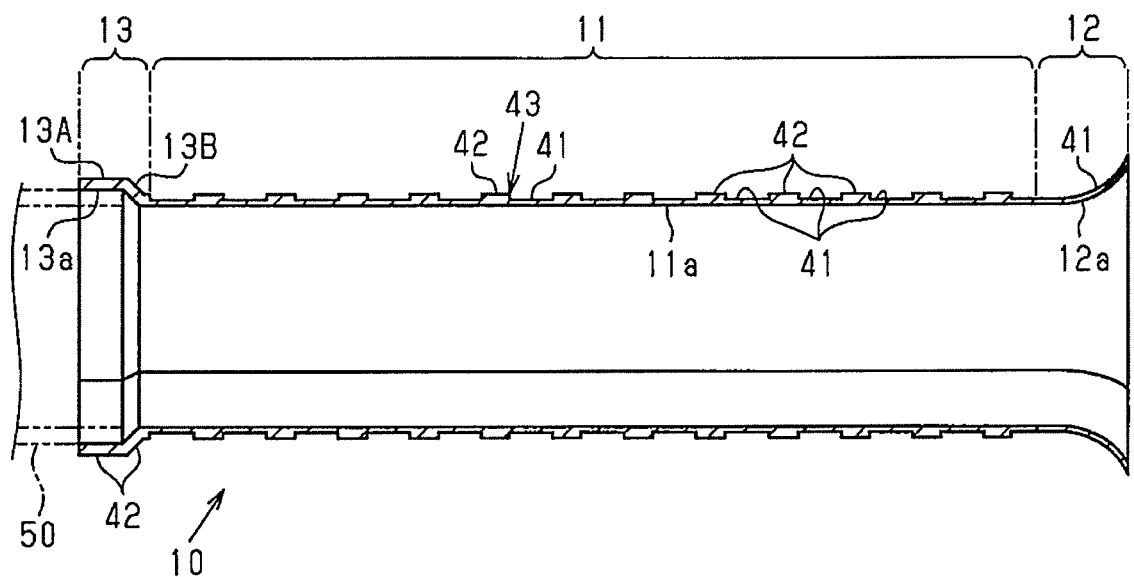
FIG. 3 is a cross-sectional view showing the inlet duct of FIG. 1.

As shown in FIGS. 1 and 3, the inlet duct 10 for an internal combustion engine has a linear central axis and includes a cylindrical body portion 11, a cylindrical suction portion 12, and a tubular coupling portion 13. The suction portion 12 is arranged on the upstream side of the body portion 11 and configures the inlet portion of the inlet duct 10. The coupling portion 13 is arranged on the downstream side of the body portion 11.

With reference to FIG. 3, the body portion 11 has a uniform inner diameter over the entire length in the axial direction.

The suction portion 12 has a funnel-like shape and has an inner diameter that becomes greater toward the upstream side. The inner diameter of the downstream end of the suction portion 12 is equal to the inner diameter of the body portion 11.

The coupling portion 13 has a large-diameter portion 13A and a gradually-changing-diameter portion 13B. The large-diameter portion 13A is located at the downstream end of the inlet duct 10. The gradually-changing-diameter portion 13B is located between the body portion 11 and the large-diameter portion 13A. The large-diameter portion 13A has an inner diameter greater than the inner diameter of the body portion 11. The gradually-changing-diameter portion 13B has an inner diameter that becomes gradually greater toward the downstream side. The large-diameter portion 13A of the coupling portion 13 is coupled to an inlet 50 of an air cleaner. The inlet 50 is represented by long dashed double-short dashed lines in FIG. 3.

Figure 2:
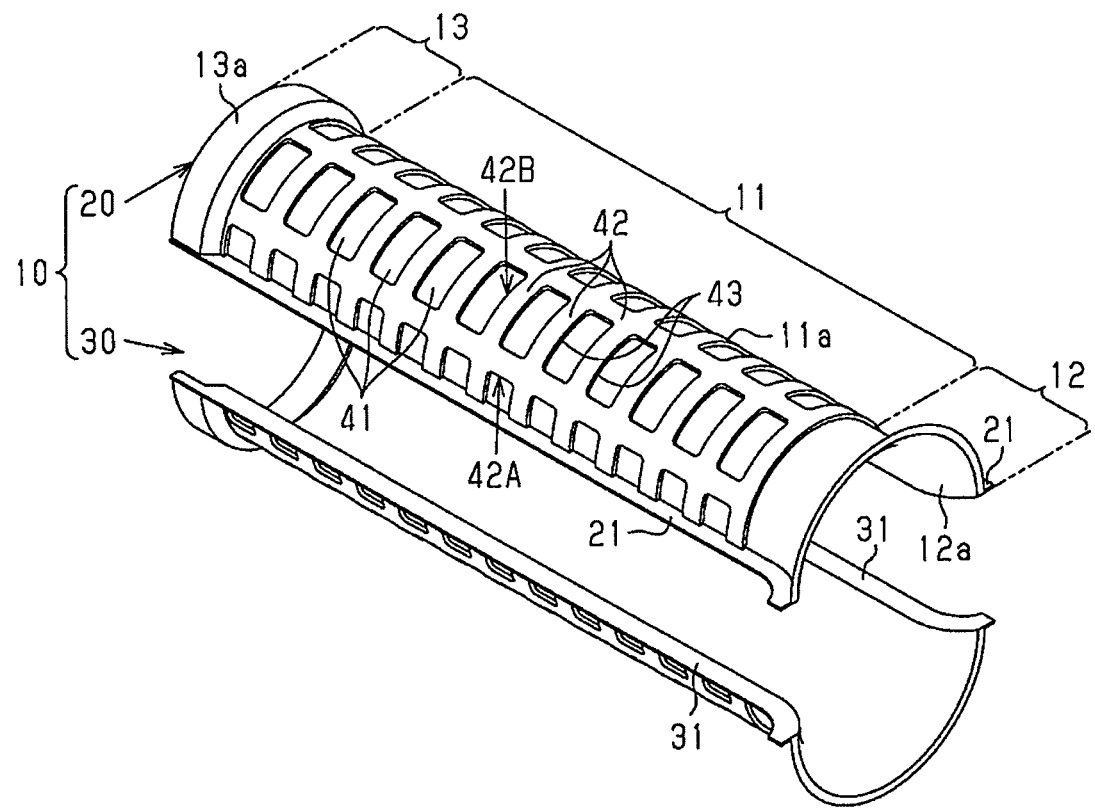
FIG. 2 is an exploded perspective view showing two split halves configuring the inlet duct of FIG. 1 in a separated state.

As illustrated in FIGS. 1 and 2, the inlet duct 10 has two split halves shaped like half pipes (a first split half 20 and a second split half 30). The split halves 20, 30 have the same shape. Two joint portions 21 are arranged at the opposite circumferential ends of the split half 20 and extend over the entire length in the axial direction of the inlet duct 10. The joint portions 21 each project radially outward. Similarly, two joint portions 31 are arranged at the opposite circumferential ends of the split half 30 and extend over the entire length in the axial direction of the inlet duct 10. The joint portions 31 each project radially outward. Each of the joint portions 21 of the first split half 20 and the corresponding one of the joint portions 31 of the second split half 30 are pressed against and joined to each other through welding.

In the present embodiment, the body portion 11, the suction portion 12, and the coupling portion 13 configure the split halves 20, 30 and are formed integrally by compression-molded fiber moldings.

Next, the fiber moldings, which configure the split halves 20, 30, will be described.

Figure 4:
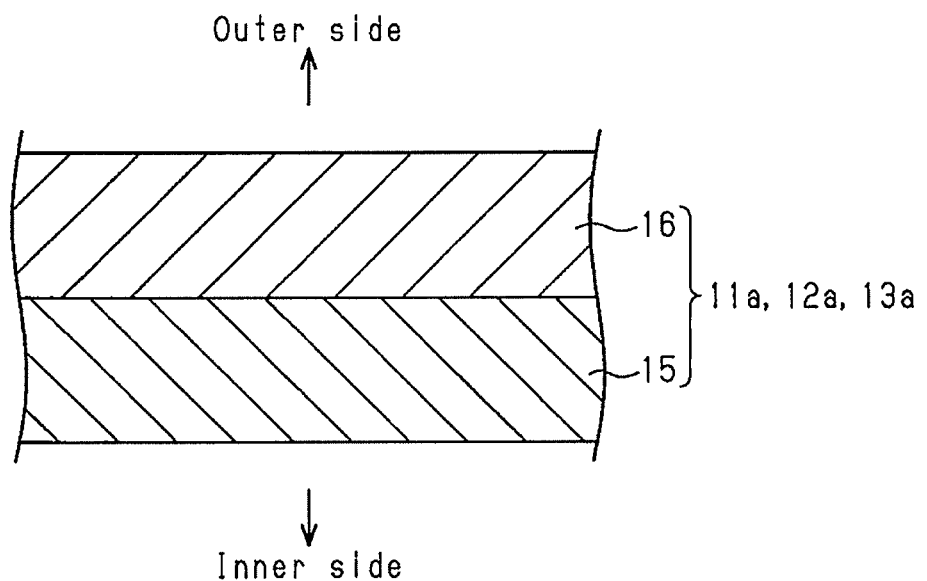
FIG. 4 is a cross-sectional view showing the layered structure of a side wall of the inlet duct of FIG. 1.

The side wall of the inlet duct 10 includes a side wall 11a of the body portion 11, a side wall 12a of the suction portion 12, and a side wall 13a of the coupling portion 13. With reference to FIG. 4, the side wall of the inlet duct 10 includes an inner layer 15 and an outer layer 16. The inner layer 15 configures the inner peripheral surface of the inlet duct 10.

The outer layer 16 is fixed to the outer peripheral surface of the inner layer 15 and forms the outer peripheral surface of the inlet duct 10.

The fiber moldings, which configure the inner layer 15 and the outer layer 16, are formed using a non-woven fabric made of known sheath-core bicomponent fiber and non-woven fabric made of polyethylene terephthalate (PET) fiber. The sheath-core-bicomponent fiber has a core portion (not shown) made of, for example, PET and a sheath portion (not shown) made of modified PET having a melting point lower than that of the PET fiber. Specifically, the modified PET forming the sheath portion of the aforementioned bicomponent fiber functions as a binder that binds the fibers together.

It is preferable that the mixing ratio of the modified PET be 30% to 70%. In the present embodiment, the mixing ratio of the modified PET is 50%.

Specifically, bicomponent fiber containing polypropylene (PP) having a melting point lower than that of PET may be employed as such bicomponent fiber.

It is preferable that the weight per unit area of each of the fiber moldings, which configure the inner layer 15 and the outer layer 16, be 250 to 750 g/m$^2$. In the present embodiment, the weight per unit area of each of the fiber moldings, which configure the inner and outer layers 15, 16, is 400 g/m$^2$.

Each of the split halves 20, 30 is molded by thermally compressing (thermally pressing) a sheet of the aforementioned non-woven fabric having a predetermined thickness (for example, 30 to 100 mm).

The shapes of the respective sections of the inlet duct 10 will now be described.

As illustrated in FIGS. 1 to 3, the side wall 11a of the body portion 11 has multiple high-compression portions 41 and multiple air-permeable low-compression portions 42. The low-compression portions 42 are each molded by being thermally compressed at a compression ratio lower than the high-compression portions 41. Each of the low-compression portions 42 is located between adjacent two of the high-compression portions 41.

The air permeability (as defined in JIS L1096, A-method (Frazier method)) of the high-compression portions 41 is substantially 0 cm$^3$/cm$^2$·s. It is preferable that the thickness of each high-compression portion 41 be 0.5 to 1.5 mm. In the present embodiment, the thickness of the high-compression portion 41 is 0.7 mm.

The air permeability of each of the low-compression portions 42 is 3 cm$^3$/cm$^2$·s. It is preferable that the thickness of each low-compression portion 42 be 0.8 to 3.0 mm. In the present embodiment, the thickness of the low-compression portion 42 is 1.0 mm.

As shown in FIGS. 1 and 2, each high-compression portion 41 has a rectangular shape having long sides extending in the circumferential direction of the body portion 11 and short sides extending in the axial direction of the body portion 11. The high-compression portions 41 are spaced apart both in the circumferential direction and the axial direction.

The low-compression portions 42 in the side wall 11a of the body portion 11 are configured by multiple linear sections 42A and multiple annular sections 42B. The linear sections 42A extend linearly over the entire length in the axial direction of the body portion 11. The annular sections 42B each extend in the circumferential direction of the body portion 11.

As shown in FIG. 3, each of the high-compression portions 41 and the adjacent one of the low-compression portions 42 are connected to each other with a step 43 in between on the outer peripheral surface of the side wall 11a of the body portion 11. In contrast, the high-compression portions 41 and the low-compression portions 42 are connected to each other to be flush with each other on the inner peripheral surface of the side wall 11a of the body portion 11.

The side wall 12a of the suction portion 12 is entirely configured by the corresponding high-compression portions 41 and is air-impermeable.

The side wall 13a of the coupling portion 13 is entirely configured by the corresponding low-compression portions 42.

The joint portions 21, 31 of the split halves 20, 30 are configured by the corresponding high-compression portions 41 and are air-impermeable.

The inlet duct for an internal combustion engine of the above-described embodiment has the following advantages.

(1) The inlet duct 10 has the tubular body portion 11 and the tubular suction portion 12. The body portion 11 has the air-permeable side wall 11a. The suction portion 12 is arranged on the upstream side of the body portion 11 and has the inner peripheral surface that expands radially outward toward the upstream side. The body portion 11 and the suction portion 12 are formed integrally by compression-molded fiber moldings.

In this configuration, the side wall 11a of the body portion 11 is formed by the compression-molded fiber moldings and is air-permeable. The side wall 11a thus absorbs some of the sound waves of intake sound when the intake sounds pass through the side wall 11a of the inlet duct 10, thus decreasing intake noise.

Also, in the above-described configuration, the body portion 11 and the suction portion 12 are formed integrally by the compression-molded fiber moldings.

This simplifies the configuration of the inlet duct 10 and facilitates forming the inlet duct 10, as compared to a configuration in which the body portion 11 and the suction portion 12 are formed separately from each other and then coupled to each other.

Further, the suction portion 12 and the body portion 11 lack a step at the boundary between the suction portion 12 and the body portion 11. The airflow resistance to the intake air flowing in the inlet duct 10 is thus not increased due to such a step.

As a result, increase in the air-flow resistance is limited while intake noise is decreased by the air permeability of the side wall 11a of the body portion 11.

(2) The side wall 12a of the suction portion 12 is entirely air-impermeable.

In this configuration, the external air is not drawn in through the side wall 12a of the suction portion 12. This limits enlargement of the boundary layer in the proximity of the inner surface of the suction portion 12. As a result, despite the fact that the body portion 11 and the suction portion 12 are formed integrally by the compressed-molded fiber moldings, the flow of intake air in the suction portion 12 is further smoothened. This further limits increase in the airflow resistance.

(3) The suction portion 12 has a funnel-like shape.

In this configuration, the air that is drawn in through the suction portion 12 flows smoothly along the funnel-like inner peripheral surface of the suction portion 12. This limits separation of the intake air from the inner peripheral surface of the suction portion 12. As a result, increase in the airflow resistance is further limited.

(4) The inlet duct 10 has the coupling portion 13. The coupling portion 13 is arranged on the downstream side of the body portion 11. The body portion 11, the suction portion 12, and the coupling portion 13 are formed integrally by fiber moldings.

In this configuration, the body portion 11, and the suction portion 12, and the coupling portion 13 configure the inlet duct 10 and are formed integrally by compression-molded fiber moldings. This simplifies the configuration of the inlet duct 10, as compared to a configuration in which a coupling portion is formed separately from an inlet duct body (the body portion 11 and the suction portion 12) and then coupled to the inlet duct body. Forming the inlet duct 10 is thus facilitated.

(5) The side wall 11a of the body portion 11 has the high-compression portions 41 and the low-compression portions 42. The low-compression portions 42 are compression-molded at a lower compression ratio than the high-compression portions 41. Each of the high-compression portions 41 and the adjacent one of the low-compression portions 42 are connected to each other with a step 43 in between on the outer peripheral surface of the side wall 11a of the body portion 11. In contrast, the high-compression portions 41 and the low-compression portions 42 are connected to each other to be flush with each other on the inner peripheral surface of the side wall 11a of the body portion 11.

In this configuration, the side wall 11a of the body portion 11 has the high-compression portions 41 and the low-compression portions 42. The high-compression portions 41 ensure the rigidity in the inlet duct 10, and the low-compression portions 42 decrease intake noise.

(6) The side wall 12a of the suction portion 12 is entirely configured by the high-compression portions 41.

In this configuration, the external air is not drawn in through the side wall 12a of the suction portion 12. Also, the configuration limits enlargement of the boundary layer in the proximity of the inner surface of the suction portion 12. This further smoothens the flow of intake air in the suction portion 12. Increase in the airflow resistance is thus further limited.

(7) The fiber moldings (the body portion 11, the suction portion 12, and the coupling portion 13) configure the two split halves 20, 30. The split halves 20, 30 are shaped like half pipes. The inlet duct 10 is formed by pressing the split halves 20, 30 against each other and joining the split halves 20, 30 to each other.

This configuration allows the inlet duct 10 to be formed by, after forming the split halves 20, 30, pressing the split halves 20, 30 against each other and joining the split halves 20, 30 to each other. This facilitates forming the inlet duct 10.

<Modifications>

It should be apparent to those skilled in the art that the present invention may be embodied in many other specific forms without departing from the scope of the invention. Particularly, it should be understood that the present invention may be embodied in the following forms.

In the above-described embodiment, at least one of the inner layer 15 and the outer layer 16, which configure the side wall of the inlet duct 10, may be water-repellent finished. This restricts rain permeation into the inlet duct 10 through the side wall of the inlet duct 10.

Figure 5:
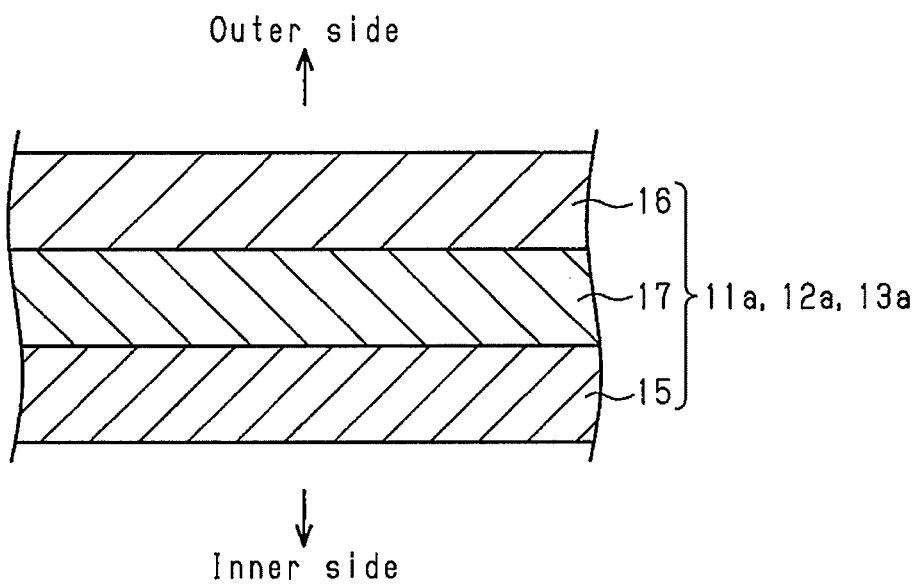
FIG. 5 is a cross-sectional view showing the layered structure of a side wall of an inlet duct of a modification.

The layered structure of the side wall of the inlet duct 10 is not restricted to the double-layered structure of the above-described embodiment. Alternatively, as illustrated in FIG. 5, an intermediate layer 17 may be arranged between the inner layer 15 and the outer layer 16. In this case, at least one of the three layers 15, 16, and 17 may be water-repellent finished.

The inlet duct 10 is not restricted to an inlet duct configured by two split halves. For example, an elongated fiber molding may be wound in a helical shape and thermal molded to form a duct body. In this case, it is preferable that the end surfaces in the width direction of the fiber molding, which forms the inner peripheral surface of the duct body, be joined to each other so as not to form a step in the fiber molding.

In the above-described embodiment, the side wall 12a of the suction portion 12 is entirely configured by the high-compression portions 41. However, the side wall 12a of the suction portion 12 may have a shape similar to that of the side wall 11a of the body portion 11. That is, the suction portion may be formed to have a side wall with an outer peripheral surface on which each of the high-compression portions 41 and an adjacent one of the low-compression portions 42 are connected to each other with a step 43 in between and an inner peripheral surface on which the high-compression portions 41 and the low-compression portions 42 are connected to each other to be flush with each other.

Figure 6:
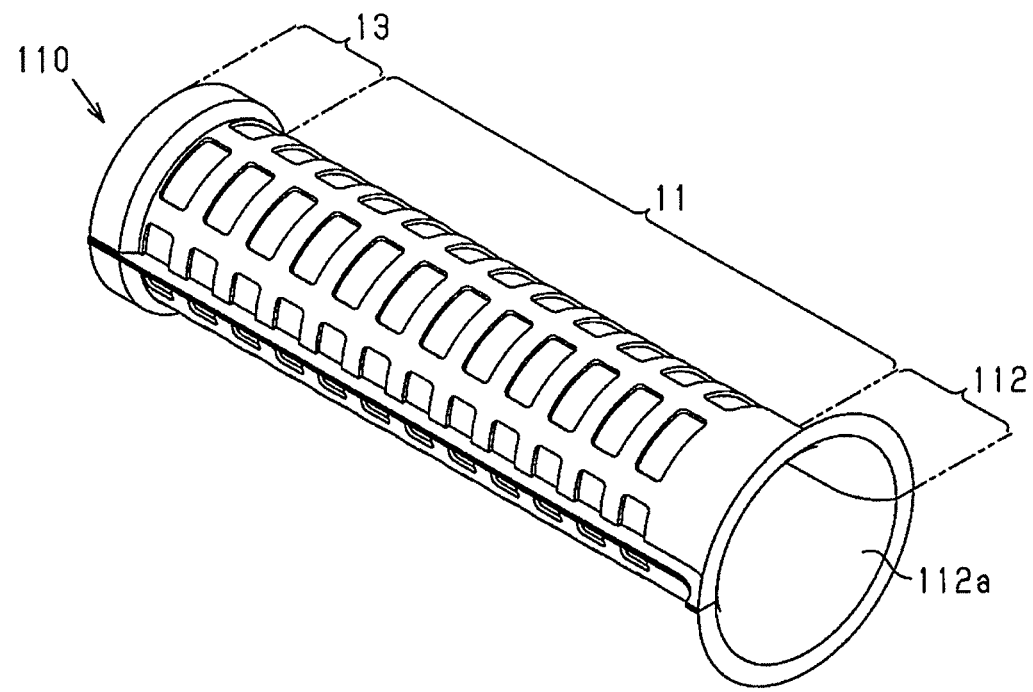
FIG. 6 is a perspective view showing an inlet duct of another modification.

In this case, as in an inlet duct 110 shown in FIG. 6, a side wall 112a of a suction portion 112 may be entirely configured by low-compression portions 42. In this case, by fixing an air-impermeable sheet material to the outer peripheral surface of the side wall 112a of the suction portion 112, the same advantage as the advantage (6) of the above-described embodiment is obtained.

In the above-described embodiment, the body portion 11, the suction portion 12, and the coupling portion 13 configure the split halves 20, 30 and are formed integrally. However, the body portion 11 and the suction portion 12 may be formed integrally by a fiber molding. The fiber molding (the body portion 11 and the suction portion 12) is thus configured as a separate member from a coupling portion. In this case, a cylindrical coupling portion made of a hard plastic, for example, may be joined to an inlet duct body that is formed by split halves having a body portion and a suction portion.

The suction portion 12 is not restricted to a funnel-like suction portion, that is, a suction portion having a curved cross section. The suction portion may be shaped in any other manner as long as the suction portion is shaped as a tube having an inner peripheral surface that expands radially outward toward the upstream side. For example, the suction portion may be shaped such that the inner peripheral surface of the suction portion is inclined at a predetermined angle with respect to the central axis of the inlet duct to become more spaced from the axis of the inlet duct toward the upstream side.

The present examples and embodiments are to be considered as illustrative and not restrictive, and the invention is not to be limited to the details given herein, but may be modified within the scope and equivalence of the appended claims.

The invention claimed is:

1. An inlet duct for an internal combustion engine, comprising:
   a tubular body portion having an air-permeable side wall; and
   a tubular suction portion that is arranged on an upstream side of the body portion in an intake airflow direction and has an inner peripheral surface that expands radially outward toward the upstream side, wherein the body portion and the suction portion are formed integrally by a compression-molded fiber molding, the suction portion has a funnel-like shape and has an inner diameter that becomes greater toward the upstream side, the side wall of the body portion has a high-compression portion and a low-compression portion, which is compression-molded at a lower compression ratio than the high-compression portion, the high-compression portion and the low-compression portion are connected to each other with a step in between on an outer peripheral surface of the side wall of the body portion, and the high-compression portion and the low-compression portion are connected to each other to be flush with each other on an inner peripheral surface of the side wall of the body portion.

2. The inlet duct according to claim 1, wherein the suction portion has a side wall that is entirely air-impermeable.

3. The inlet duct according to claim 1, comprising a coupling portion that is arranged on a downstream side of the body portion in the intake airflow direction, wherein the body portion, the suction portion, and the coupling portion are formed integrally by the fiber molding.

4. The inlet duct according to claim 1, wherein the suction portion has a side wall that is entirely configured by the high-compression portion.

5. The inlet duct according to claim 1, wherein the fiber molding configures two split halves shaped like half pipes, and the inlet duct is formed by pressing the split halves against each other and joining the split halves to each other.

6. An inlet duct for an internal combustion engine, comprising:

a tubular body portion having an air-permeable side wall; and a tubular suction portion that is arranged on an upstream side of the body portion in an intake airflow direction and has an inner peripheral surface that expands radially outward toward the upstream side, wherein the body portion and the suction portion are formed integrally by a compression-molded fiber molding, the side wall of the body portion has a high-compression portion and an air-permeable low-compression portion, which is compression-molded at a lower compression ratio than the high-compression portion, an outer peripheral surface of the side wall configures an outer peripheral surface of the body portion, an inner peripheral surface of the side wall configures an inner peripheral surface of the body portion, the high-compression portion and the low-compression portion are connected to each other with a step in between on the outer peripheral surface of the side wall of the body portion, and the high-compression portion and the low-compression portion are connected to each other to be flush with each other on the inner peripheral surface of the side wall of the body portion.

7. The inlet duct according to claim 6, wherein the suction portion has a side wall that is entirely air-impermeable.

8. The inlet duct according to claim 6, comprising a coupling portion that is arranged on a downstream side of the body portion in the intake airflow direction, wherein the body portion, the suction portion, and the coupling portion are formed integrally by the fiber molding.

9. The inlet duct according to claim 6, wherein the suction portion has a side wall that is entirely configured by the high-compression portion.

10. The inlet duct according to claim 6, wherein the fiber molding configures two split halves shaped like half pipes, and the inlet duct is formed by pressing the split halves against each other and joining the split halves to each other.

* * * * *